United States Patent Office 3,542,854
Patented Nov. 24, 1970

3,542,854
THIAMPHENICOL DERIVATIVE
Uberto M. Teotino, Milan, Italy, assignor to Whitefin Holding S.A., Lugano, Switzerland
No Drawing. Filed Mar. 9, 1966, Ser. No. 532,883
Claims priority, application France, Mar. 29, 1965, 11,035
Int. Cl. C07c 101/18
U.S. Cl. 260—482                    1 Claim

ABSTRACT OF THE DISCLOSURE

A new thiamphenicol derivative has been prepared, having the formula:

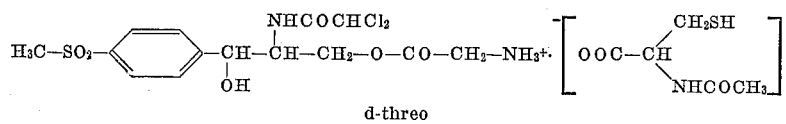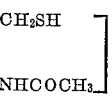

d-threo which is water-soluble, tasteless, odorless and exercises a strong mucolytic action as well as as antibacteric action higher than that of the thiamphenicol, with respect to many microorganisms which are responsible for respiratory diseases.

The present invention relates to a new compound, particularly useful in the therapeutic field for all the clinical forms characterized by the presence of thick and viscous secretions, where infective processes are in course or it is wanted to prevent their appearance.

It is known that acetylcysteine is a therapeutic agent endowed with marked mucolytic power (U.S. Pat. No. 3,091,569) which can be favourably used for topical treatment of respiratory diseases showing the presence of viscous secretions, although its use is in part prejudiced owing to its unpleasant odor. However, there are frequent cases in which the presence of viscous secretions is concomitant with an infective process. In such cases the topical treatment with an antibacteric agent is hindered by the mucous barrier, while, on the other hand, the treatment with a mucolytic agent does not resolve the infective process. Therefore it would be desirable to carry out the topical treatment contemporaneously both with a mucolytic agent and with a chemiotherapic agent having wide range of action. But so far such a treatment could not be realized with acetylcysteine owing to the following reasons: the penicillin and the bacitracin are inactivated by the acetylcysteine and vice versa (The Journal of Pediatrics 62, 35, 1963), the streptomycin cannot be used by aerosol way because it involves the danger of local reactions and sensibilizations (New England J. Med. 237, 683–692, 1947; J.A.M.A. 138, 640–41, 1948); chloramphenicol cannot be used since it is water-insoluble (Merck Index, 7th ed., p. 234), whilst its soluble derivatives, such as the sodic salts of its monosuccinic ester, have an unbearably bitter taste; the tetracyclines, for their part, cannot be used because of their irritating action on the mucous membranes and on the tissues they contact.

Therefore the only solution possible for carrying out at the same time a treatment with acetylcysteine and a chemiotherapic agent was to associate it with chemiotherapic products with limited spectrum.

I have now found the compound having the formula:

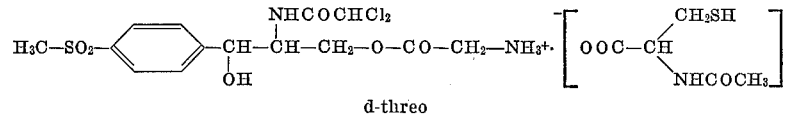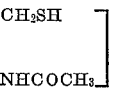

d-threo which is water-soluble, tasteless, odorless, and exercises a strong mucolytic action and an antibacteric action higher than that of the thiamphenicol with respect to many germs which are responsible for respiratory diseases, without however exhibiting any of the above mentioned inconveniences. Furthermore the compound of the present invention does no more exhibit the unpleasant sulphurous odor proper of the acetylcysteine. This compound, therefore, possesses all the therapeutic and organolectic requisites required for the topical treatment, in particular the aerosol treatment, of all those respiratory diseases which are characterized by the contemporaneous presence of infective centers and viscous secretions.

The new therapeutic product of the present invention can be prepared according to the following procedure:

6.4 g. of d-threo 1-(p-methylsulfonylphenyl)-2-di-chloro-acetamido-3-amino-acetoxy-1-propanol and 2.5 g. of N-acetyl-1-cysteine are dissolved in 350 ml. of anhydrous methyl alcohol. The solution thus obtained is decoloured with carbon and filtered. The filtrate is concentrated in vacuo, up to dryness. The residue is taken up with 25 ml. of anhydrous methyl alcohol and 150 ml. of anhydrous ethyl ether, and then filtered. The residue is washed again with a small amount of ether, and dried in vacuo. 7.20 g. of product are thus obtained.

Analysis.—Calculated (percent): N, 7.29; Cl, 12.3; S, 11.12. Found (percent): N, 7.35; Cl, 12.3; S, 11.03.

The compound thus obtained is a white microcrystalline powder, which is odorless and tasteless.

It contains 61.5% of thiamphenicol and 28.31% of acetylcysteine. Its molecular weight is 576.49, melting point=158–160° C. (with decomposition), and it is greatly soluble in water even at room temperature; in ethyl alcohol it dissolves only at its boiling point. The 10% aqueous solution has a pH of 4.6.

PHARMACOLOGY

Acute toxicity: When injected in rats intraveneously at the rate of 120 mg./kg./min., the $DL_{50}$ is 1547 mg./kg. The toxic symptoms are tremors, dispnea, convulsions.

Chronic toxicity: The tests of chronic toxicity on adult rats were carried out by aerosol treatment with 10% aqueous solutions for 15 minutes every day for more than 4 weeks. The histologic study of the lungs, trachea, bronchia, larynx, liver, kidneys and blood of the animals thus treated, did not reveal any alteration.

Action on blood pressure, breathing and isolated heart: The tests carried out on rabbits under anaesthesia showed, at the intravenous dose of 40 mg./kg., a slowing down of the respiratory movements and a slight reduction of the blood pressure; these effects, however, disappeared rapidly.

Antibacterial activity "in vitro": Thiamphenicol glycinate and acetylcysteinate of thiamphenicol glycinate were tested parallely on various bacteria stocks generally belonging to kinds or types of the saprophytic and pathogenic flora of human respiratory ducts, such as klebsielle, streptococcus, dyplococcus, staphylococcus.

We have used the method of increasing a liquid medium solution. The tubes sown with the germs to be tested were placed, under anaerobic conditions, in an oven at 37° C. over 18 hours: after this time the bacteriostatic concentration was observed. The culture medium used was the "Brain Heart Infusion" to which was added defibrinized mutton blood in amount of 10 percent (dyplococcus, streptococcus). The bacteriostatic concentrations of the two substances, expressed in micro g. per ml. of medium, proved with respect to the microbic species that the antibacter activity of the acetylcysteinate of thiamphenicol gycinate was higher by 20 to 50% than the antibacter activity of the thiamphenicol glycinate alone.

Taking into account that the N-acetylcysteinate has no antibacteric action and that the cystenate of thiamphenicol gylcinate has just the same activity of the thiamphenicol alone, the increased activity of the N-acetylcysteinate of thiamphenicol gycinate is quite surprising.

CLINICAL TESTS

The compound of the present invention was administered by aerosol and by bronchial instillation in various acute and chronic diseases of the respiratory apparatus characterized by the presence of mucus and of mucopurulent secretions and by an infective component.

The fluidification of the secretions was rapid and sharp and was constantly accompanied by attenuation or by disappearance of the purulent component and of the phlogistic picture.

The amount of expectoration became more abundant during the first days of the treatment and diminished by and by, and finally disappeared.

The fluidification of the bronchial secretion has always facilitated in a determinant way the disobstruction of the bronchia, either spontaneously or by bronchous inspiration, with considerable positive effects on the respiratory function and improvement or resolution of the local as well as general clinical picture.

MEDICINE AND PHTHISIOLOGY

The treatment of patients affected by acute and subacute bronchitis, asthmatic bronchitis, bronchioectasy, lung abscesses, tuberculosis with superposed aspecific infections, etc., has determined a sharp diminution or disappearance of the dyspnea, cyanosis, cough and fever, with positive effects also on the general conditions.

The favourable clinical results were confirmed also by laboratory tests, radiographic examinations and by thoracic semiology.

SURGERY

The compound of the present invention may prevent and heal complications of obstruent or infective character in the respiratory ducts (atelectasis, lung abscesses, bronchopneumonia etc.) which often occur after thorax operations or operations in other places. The necessity of practising broncho-inspirations was markedly reduced and, if same were made necessary due to the presence of a severe organic illness, they were always facilitated.

Moreover it must be pointed out that the treatment with the compound of the present invention has most probably avoided the tracheostomy in a patient affected by severe myastheny.

OTORHINOLARYNGOLOGY

The compound has proved to be of extreme utility both as prophylactic and curative medicine for obstruent and infective complications of the respiratory apparatus which often appear in subjects bearing a cannula or suffering tracheal stomatitis.

TOLERANCE

The clinical tests have confirmed the excellent tolerance of the compound, the appearance of collateral effects of irritative and bronchospastic type being practically absent.

Bronchoscopic tests carried out on patients before and after prolonged treatments did not make evident any modification of the respiratory mucous membrane.

INDICATIONS

The compound of the present invention is useful for all clinical forms characterized by the presence of thick and viscous secretion where infective processes are in course or where it is wished to prevent the arising thereof.

Medicine: acute and chonic bronchitis, bronchopneumonia and pneumonia with slow evolution, lung abscess, emphysema, atelectasy.

Surgery: Prophylaxis and treatment of broncho-pneumoina complications due to surgical interventions (thoracic, abdominal operations, etc.); brochopneumonia, atelectasy, lung abscess. Facilitation of broncho-inspiration handling during anaesthesy and post-operative course, and prophylaxis of infective complications.

Otorhinolaryngology: catarrhal and purulent otitis, tubal infections, rhinopharyngitis, laryngotracheitis. Prophylaxis and treatment of obstruent and infective complications subsequent to tracheostomy, preparation for the bronchoscopy, bronchography, and broncho-inspiration.

Phthisiology: aspectific infective forms with bronchial catarrh associated with pulmonary consumption. Retention of secretions with unsufficient drainage of cavity lesions.

Pediatry: bronchitis and bronchopneumonia with particular reference to those having slow evolution, bronchiolitis, whooping cough, mucoviscidosis. Some forms of asphyxia of new-born babies.

DIRECTIONS AND DOSES

The compound of the present invention may be administered via aerosol, by endobronchial instillation, endobronchial instillation, endoauricular or other cavities instillation or washings by means of pharmaceutical forms generally used for these kinds of administration.

By way of a non-limitative example we cite one of the processes by which a pharamaceutical form can be prepared which is suitable for the following purpose:

400 g. of the compound according to the present invention are dissolved in 4 litres of water; the solution thus obtained is filtered through a Seitz filter, and subdivided in 1000 flasks having 5 ml. capacity.

The 1000 flasks are placed in a lyophilizer and on completion of the lyophilization they are closed with pierceable rubber stoppers, and sealed.

At the moment of use, 3 to 5 ml. of a physiological solution are introduced into the flask, which is then agitated. In this way a limpid solution is obtained which must be used within 4 to 5 days.

For aerosol administration: For an adult, one or two applications per day for 5 to 10 days or more, depending on the evolution of the clinical form, of nebulized 3 to 5 ml. of physiological solution containing 400 mg. of the compound, are recommended. For children, the above dose is halved.

For endobronchial instillation: According to the chosen administration method (permanent probes, or bronchoscope etc.), 400 to 800 mg. of compound in 6 to 11 ml. of physiological solution each time, are administered once or twice per day, depending on requirement.

For instillations or endoauricular washing or washing of other cavities: The average dosage is 200 mg. of compound in 1.5 to 2.5 ml. of physiological solution.

What is claimed is:
1. The compound having the formula:
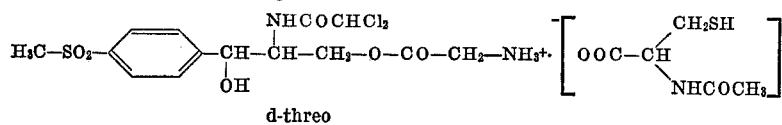
d-threo
References Cited
UNITED STATES PATENTS
| | | | |
|---|---|---|---|
| 3,000,922 | 9/1961 | De Wald et al. | 260—482 XR |
| 3,091,569 | 5/1963 | Sheffner | 260—534 XR |
| 3,100,781 | 8/1963 | Concilio et al. | 260—482 XR |
| 3,190,910 | 6/1965 | Nicolaides | 260—482 |
| 3,367,948 | 2/1968 | Gapp et al. | 260—482 XR |
FOREIGN PATENTS
11,119 2/1962 France.
OTHER REFERENCES
Chemical Week, Mar. 16, 1968, pp. 39–40.
JAMES A. PATTEN, Primary Examiner
P. J. KILLUS, Assistant Examiner
U.S. Cl. X.R.
424—311

UNITED STATES PATENT OFFICE
CERTIFICATE OF CORRECTION

Patent No. 3,542,854                    Dated November 24, 1970

Inventor(s) Uberto M. Teotino

It is certified that error appears in the above-identified patent and that said Letters Patent are hereby corrected as shown below:

Column 3, line 14, "gycinate" should read --glycinate-- column 3, line 18, "cystenate of" should be cancelled; column 3, line 44, "PHTHISIOLOGY" should read --PHYSIOLOGY- Column 4, line 17, "chonic" should read --chronic--; column line 31, "Phthisiology: aspectific" should read --Physiolog; aspecific--; column 4, lines 44 and 45, "endobronchial instillation, endobronchial instillation" should read --endobronchial instillation--. Column 6, line 13, "KILLUS should read --KILLOS--.

Signed and sealed this 18th day of April 1972.

(SEAL)
Attest:

EDWARD M. FLETCHER, JR.           ROBERT GOTTSCHALK
Attesting Officer                  Commissioner of Patents